United States Patent
Nielsen et al.

(10) Patent No.: US 12,438,762 B2
(45) Date of Patent: Oct. 7, 2025

(54) APPARATUS AND METHOD FOR SENSING AND COMMUNICATIONS

(71) Applicant: Nokia Technologies Oy, Espoo (FI)

(72) Inventors: Kim Nielsen, Aalborg (DK); Amol Dhere, Aalborg (DK); Bent Henneberg Rysgaard, Aalborg (DK)

(73) Assignee: Nokia Technologies Oy, Espoo (FI)

(*) Notice: Subject to any disclaimer, the term of this patent is extended or adjusted under 35 U.S.C. 154(b) by 34 days.

(21) Appl. No.: 18/481,682

(22) Filed: Oct. 5, 2023

(65) Prior Publication Data

US 2024/0121146 A1    Apr. 11, 2024

(30) Foreign Application Priority Data

Oct. 10, 2022 (EP) .................................. 22200660

(51) Int. Cl.
*H04L 27/26* (2006.01)
*H04L 5/00* (2006.01)

(52) U.S. Cl.
CPC .......... *H04L 27/2647* (2013.01); *H04L 5/001* (2013.01)

(58) Field of Classification Search
CPC ............................ H04L 27/2647; H04L 5/001
See application file for complete search history.

(56) References Cited

U.S. PATENT DOCUMENTS

| | | | |
|---|---|---|---|
| 2014/0120925 A1 | 5/2014 | Kanthala et al. | |
| 2014/0171001 A1 | 6/2014 | Fernando et al. | |
| 2016/0262200 A1 | 9/2016 | Su | |
| 2016/0278106 A1 | 9/2016 | Jarrahi Khameneh et al. | |
| 2018/0102740 A1* | 4/2018 | Chang | H04B 1/006 |
| 2021/0120524 A1 | 4/2021 | Palle et al. | |

(Continued)

FOREIGN PATENT DOCUMENTS

| | | |
|---|---|---|
| EP | 2932631 B1 | 4/2018 |
| WO | 2022/203802 A1 | 9/2022 |

OTHER PUBLICATIONS

"3rd Generation Partnership Project; Technical Specification Group Radio Access Network; NR; User Equipment (UE) radio transmission and reception; Part 1: Range 1 Standalone (Release 17)", 3GPP TS 38.101-1, V17.5.0, Mar. 2022, 668 pages.

(Continued)

*Primary Examiner* — Janice N Tieu
(74) *Attorney, Agent, or Firm* — McCarter & English, LLP; Mark F. Harrington

(57) ABSTRACT

A method, apparatus and computer program is described comprising: receiving a first transmission from an antenna, the first transmission comprising a first carrier including a first signal and a second carrier including a second signal, wherein the first and second carriers are separated in frequency within a first operational band; splitting the first transmission into a first channel and a second channel; downconverting the first channel to centre the first carrier at a baseband frequency to extract the first signal; downconverting the second channel to centre the second carrier at the baseband frequency to extract the second signal; and providing the first signal to a first processor and the second signal to a second processor; wherein the first and second processors are associated with first and second subscriber identity modules respectively.

20 Claims, 17 Drawing Sheets

(56) References Cited

U.S. PATENT DOCUMENTS

2022/0110106 A1    4/2022    Kiilerich Pratas et al.
2022/0132521 A1    4/2022    Wang et al.

OTHER PUBLICATIONS

"3rd Generation Partnership Project; Technical Specification Group Radio Access Network; NR; User Equipment (UE) radio transmission and reception; Part 3: Range 1 and Range 2 Interworking operation with other radios (Release 17)", 3GPP TS 38.101-3, V17.5.0, Mar. 2022, 1070 pages.
"3rd Generation Partnership Project; Technical Specification Group Radio Access Network; NR; Radio Resource Control (RRC) protocol specification (Release 17)", 3GPP TS 38.331, V17.0.0, Mar. 2022, pp. 1-1221.
U.S. Appl. No. 63/358,297, "Capability Indication Update", filed Jul. 5, 2022, pp. 1-33.
European Application No. 22198325.7, "Flexible Bandwidths", filed on Sep. 28, 2022, pp. 1-38.
European Application No. 22201014.2, "Flexible Reception", filed on Oct. 12, 2022, pp. 1-37.
Sureshsah et al., "Novel 5G and B5G Network Architecture and Protocol for Multi SIM Devices", IEEE International Conference on Electronics, Computing and Communication Technologies (CONECCT), Jul. 9-11, 2021, 6 pages.
Extended European Search Report received for corresponding European Patent Application No. 22200660.3, dated Mar. 23, 2023, 7 pages.

\* cited by examiner

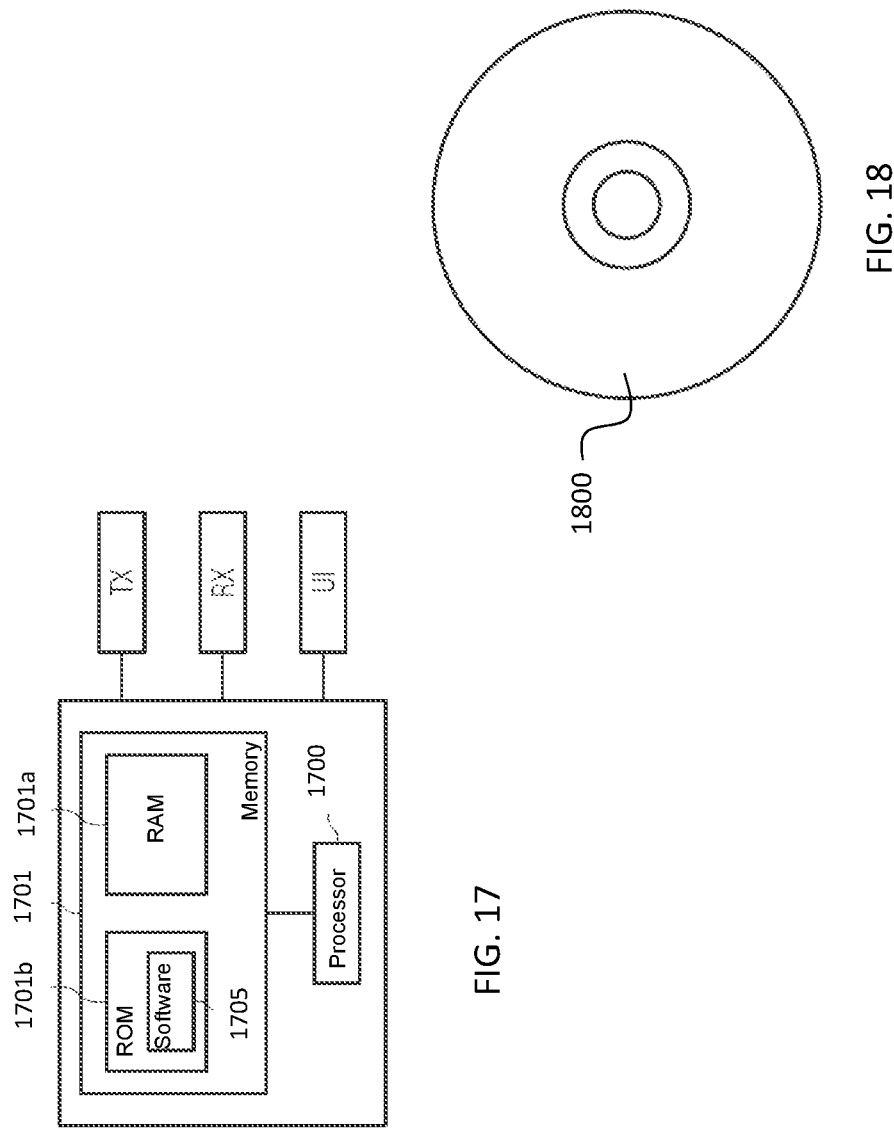

APPARATUS AND METHOD FOR SENSING AND COMMUNICATIONS

RELATED APPLICATION

This application claims priority to the European Patent Application No. 22200660.3, filed on Oct. 10, 2022, the content of which is incorporated herein by reference in its entirety.

FIELD

The present invention relates to apparatus for sensing and communications.

BACKGROUND

Front end modules and transceivers are used in sensing and communications for receiving signals for example electromagnetic signals such as radio frequency signals used for mobile telecommunication. Received signals are typically provided to a processor for processing.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is described an apparatus comprising: means for receiving a first transmission from an antenna, the first transmission comprising a first carrier including a first signal and a second carrier including a second signal, wherein the first and second carriers are separated in frequency within a first operational band; means for splitting the first transmission into a first channel and a second channel; means for downconverting the first channel to centre the first carrier at a baseband frequency to extract the first signal; means for downconverting the second channel to centre the second carrier at the baseband frequency to extract the second signal; and means for providing the first signal to a first processor and the second signal to a second processor; wherein the first and second processors are associated with first and second subscriber identity modules respectively.

The apparatus may further comprise means for receiving a second transmission from the antenna, the second transmission comprising a third carrier including a third signal, wherein the third carrier frequency is in a second operational band.

The apparatus may further comprise means for directing the second transmission to a third channel and downconverting the third channel to centre the third carrier at the baseband frequency to extract the third signal.

The apparatus may further comprise means for providing the third signal to the first or second processor.

The apparatus may further comprise means for controlling the gain of each signal independently from one another.

The apparatus may further comprise means for controlling the scheduling of each signal in time or frequency independently from one another.

The means for receiving may comprise a first front end module configured to operate at a 3GPP lowband frequency range.

The first front end module may comprise a plurality of paths each configured to operate within one or more bandgroup(s).

The first front end module may comprise three paths. At least one of the paths may be configured to support carriers having an irregular channel bandwidth.

The means for receiving may further comprise a second front end module configured to operate within at least one of a 3GPP midband, highband or ultra-highband frequency range.

The first and second subscriber identity modules may be available for use at the same time.

The apparatus may further comprise means for providing receive diversity.

According to a second aspect, there is described a method comprising: receiving a first transmission from an antenna, the first transmission comprising a first carrier including a first signal and a second carrier including a second signal, wherein the first and second carriers are separated in frequency within a first operational band; splitting the first transmission into a first channel and a second channel; downconverting the first channel to centre the first carrier at a baseband frequency to extract the first signal; downconverting the second channel to centre the second carrier at the baseband frequency to extract the second signal; and providing the first signal to a first processor and the second signal to a second processor; wherein the first and second processors are associated with first and second subscriber identity modules respectively.

The method may further comprise receiving a second transmission from the antenna, the second transmission comprising a third carrier including a third signal, wherein the third carrier frequency is in a second operational band.

The method may further comprise directing the second transmission to a third channel and downconverting the third channel to centre the third carrier at the baseband frequency to extract the third signal.

The method may further comprise providing the third signal to the first or second processor.

The method may further comprise controlling the gain of each signal independently from one another.

The method may further comprise controlling the scheduling of each signal in time or frequency independently from one another.

Receiving may comprise a first front end module configured to operate at a 3GPP lowband frequency range.

The first front end module may comprise a plurality of paths each configured to operate within one or more bandgroup(s).

The first front end module may comprise three paths. At least one of the paths may be configured to support carriers having an irregular channel bandwidth.

Receiving may further comprise a second front end module configured to operate within at least one of a 3GPP midband, highband or ultra-highband frequency range.

The first and second subscriber identity modules may be available for use at the same time.

The method may further comprise providing receive diversity.

According to a third aspect, there is provided a computer program comprising instructions which, when executed by an apparatus, cause the apparatus to: receive a first transmission from an antenna, the first transmission comprising a first carrier including a first signal and a second carrier including a second signal, wherein the first and second carriers are separated in frequency within a first operational band; split the first transmission into a first channel and a second channel; downconvert the first channel to centre the first carrier at a baseband frequency to extract the first signal; downconvert the second channel to centre the second carrier at the baseband frequency to extract the second signal; and provide the first signal to a first processor and the second signal to a second processor; wherein the first and second processors are associated with first and second subscriber identity modules respectively.

Optional features of the third aspect may comprises any features of the second aspect.

According to a fourth aspect, there is provided a non-transitory computer readable medium comprising program instructions stored thereon for performing a method, comprising: receiving a first transmission from an antenna, the first transmission comprising a first carrier including a first signal and a second carrier including a second signal, wherein the first and second carriers are separated in frequency within a first operational band; splitting the first transmission into a first channel and a second channel; downconverting the first channel to centre the first carrier at a baseband frequency to extract the first signal; downconverting the second channel to centre the second carrier at the baseband frequency to extract the second signal; and providing the first signal to a first processor and the second signal to a second processor; wherein the first and second processors are associated with first and second subscriber identity modules respectively.

The program instructions of the fourth aspect may also perform operations according to any preceding method definition of the second aspect.

According to a fifth aspect, there is provided an apparatus comprising: at least one processor; and at least one memory including computer program code which, when executed by the at least one processor, causes the apparatus to: receive a first transmission from an antenna, the first transmission comprising a first carrier including a first signal and a second carrier including a second signal, wherein the first and second carriers are separated in frequency within a first operational band; split the first transmission into a first channel and a second channel; downconvert the first channel to centre the first carrier at a baseband frequency to extract the first signal; downconvert the second channel to centre the second carrier at the baseband frequency to extract the second signal; and provide the first signal to a first processor and the second signal to a second processor; wherein the first and second processors are associated with first and second subscriber identity modules respectively.

The computer program code of the fifth aspect may also perform operations according to any preceding method definition of the second aspect.

According to a sixth aspect, this specification describes computer-readable instructions which, when executed by a computing apparatus, cause the computing apparatus to perform (at least) any method as described with reference to the second aspect.

In a seventh aspect, this specification describes a computer-readable medium (such as a non-transitory computer-readable medium) comprising program instructions stored thereon for performing (at least) any method as described with reference to the second aspect.

In an eighth aspect, this specification describes: a receiver module (or some other means) for receiving a first transmission from an antenna, the first transmission comprising a first carrier including a first signal and a second carrier including a second signal, wherein the first and second carriers are separated in frequency within a first operational band; a splitter (or some other means) for splitting the first transmission into a first channel and a second channel; a first downconverter module (or some other means) for downconverting the first channel to centre the first carrier at a baseband frequency to extract the first signal; a second downconverter module (or some other means) for downconverting the second channel to centre the second carrier at the baseband frequency to extract the second signal; and one or more connections (or some other means) for providing the first signal to a first processor and the second signal to a second processor; wherein the first and second processors are associated with first and second subscriber identity modules respectively. Optional features of the eighth aspect may comprises any features of the second aspect.

In a ninth aspect, this specification describes an apparatus comprising at least one processor, and at least one memory storing instructions that, when executed by the at least one processor, cause the apparatus at least to perform any method described herein (including the method of the second aspect described above).

BRIEF DESCRIPTION OF THE DRAWINGS

Example embodiments will now be described, by way of example only, with reference to the following schematic drawings, in which:

FIG. 17 shows an apparatus according to some example embodiments;

FIG. 18 shows a non-transitory media according to some embodiments.

DETAILED DESCRIPTION

Figure 1:
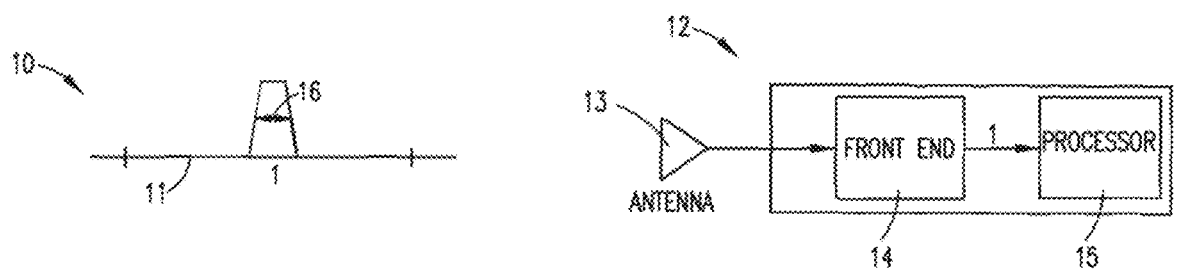
FIG. 1 is a schematic diagram showing a single SIM cellular device receiving a transmission, in accordance with an example embodiment.

The scope of protection sought for various embodiments of the disclosure is set out by the independent claims. The embodiments and features, if any, described in the specification that do not fall under the scope of the independent claims are to be interpreted as examples useful for understanding various embodiments of the disclosure.

In the description and drawings, like reference numerals refer to like elements throughout, unless otherwise provided.

Cellular communication devices such as User Equipment (UE) (for example mobile phones) typically transmit and receive carriers operating on one or more operational bands within a frequency range. For example, $3^{rd}$ Generation Partnership Project (3GPP) technical standards such as the 4G/5G New Radio (NR) standard comprises Frequency Range 1 (FR1) and Frequency Range 2 (FR2). FR1 covers sub-6 GHz and FR2 covers 24.25 GHz to 71 GHz. Furthermore, sub-1 GHz is sometimes referred to as the lowband group. The frequency range 1 GHz-2.2 GHz is sometimes referred to as the midband group and the frequency range 2.3 GHz-2.8 GHz is sometimes referred to as the highband group. The frequency range 2.8 GHz-6 GHz is sometimes referred to as the ultra-highband group.

Both FR1 and FR2 comprise a number of operational bands. FR1 operational bands are typically labelled n1, n2, n3 . . . n104. Each of the FR1 operational bands may support carriers having a number of channel bandwidths. "Regular" channel bandwidths are generally multiples of 5 MHz e.g. 5, 10, 15 . . . 100 MHz. In contrast, "irregular" channel bandwidths are generally not multiples of 5 MHz e.g. 6, 7, 11, 12 and 13 MHz. For example, operational bands n5, n12, n26, n28, n29 and n85 may support irregular channel bandwidths.

A frequency range may be arbitrarily divided into sub-ranges or bandgroups. A bandgroup may cover a group of operational bands. Channels or paths in a front end module may comprise a bandpass filter which covers a band group.

Different mobile network operators may provide carriers operating on the same or different operational bands with different channel allocations and channel bandwidths. For example, band 1120 may be utilised by company A and company B to deliver their services. Generally, network operators operate independently and there is no cross scheduling between different networks.

Typically, a cellular device comprises a Subscriber Identification Module (SIM) which determines which network operator the device will operate on.

A cellular device may receive multiple carriers from the same network operator which are provided to a SIM card receiver for carrier aggregation or dual connectivity. Multiple carriers may be in the same operational band (intra-band) or in different operational bands (inter-band). Multiple intra-band carriers may be either contiguous or non-contiguous.

A cellular communication device typically comprises an antenna, a front end module, a transceiver and a SIM card receiver. The operational bands supported by the cellular communication device are typically determined by the operating frequency of the front end module.

In some embodiments, an apparatus such as a multi-SIM cellular device may comprise more than one SIM card receiver. Such devices can support multiple SIMs and aim to provide full service (i.e. voice calls and/or data connections) on multiple subscriptions in parallel on a single cellular device. For example, two SIMs provided by a single user device may be used for different purposes (e.g. business and personal purposes), which can be either of same network operator or from different network operators.

In some example embodiments, an apparatus may be a Dual-SIM Dual Standby (DSDS) device. A DSDS device can support two SIM cards. A DSDS device supports any connection type on one of the two SIM cards at any given time.

In some example embodiments, an apparatus may be a Dual-SIM Dual Active (DSDA) device. A DSDA device can support two SIM cards. A DSDA device is configured to support a voice connection on one SIM card at a time (the device may present incoming calls on both but only provide active voice on one at a given time) and/or data transfer on both cards at the same time. In other words, a DSDA device is configured to support two parallel connected mode operations, one for each SIM, at any point in time. In some example embodiments, the DSDA device is further configured to support two parallel connected mode operations, one for each SIM, at any point in time and within the same bandgroup; for example: lowband, midband, highband or ultra-highband. In some example embodiments, the DSDA device is further configured to support two parallel connected mode operations within the same operational band.

FIG. 1 is a schematic diagram showing an example embodiment of a single SIM cellular device 12 receiving a transmission to. The transmission to comprises a first carrier 1 which carries a first signal. The centre frequency of the first carrier 1 is in an operational band 11. The first carrier 1 comprises a channel bandwidth 16. The cellular device 12 comprises an antenna 13 which receives the transmission to and provides the received transmission to a front end module/transceiver 14. The front end module/transceiver 14 downconverts and digitises the transmission 10 to extract the first signal 1 before directing it to a processor 15 associated with a SIM card (not shown).

Figure 2:
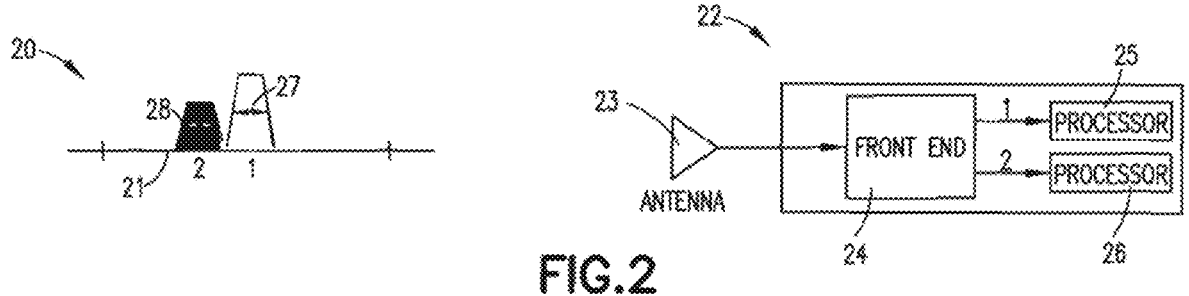
FIG. 2 is a schematic diagram showing an apparatus receiving a transmission, in accordance with an example embodiment.

FIG. 2 is a schematic diagram showing an apparatus 22 (which may be a dual-SIM cellular device) receiving a transmission 20, in accordance with an example embodiment. The transmission 20 comprises the first carrier 1 (which carries the first signal described above) and a second carrier 2 which carries a second signal. The first carrier 1 and second carrier 2 are separated in frequency within an operational band 21. The first carrier 1 comprises a first channel bandwidth 27. The second carrier 2 comprises a second channel bandwidth 28. The first and second channel bandwidths may be the same or different and may be a regular or irregular channel bandwidth. The cellular device 22 comprises an antenna 23 which receives the transmission 20 and provides the received transmission to a front end module/transceiver 24. The front end module/transceiver 24 extracts the first signal from the first carrier 1 of transmission 20 and the second signal from the second carrier 2 of transmission 20 before directing the first signal to a first processor 25 and the second signal to a second processor 26; the first and second processors 25, 26 associated with first and second SIM cards (not shown) respectively. The second carrier 2 may be provided by the same or different network operator(s) as the first carrier 1.

Figures 3, 4:
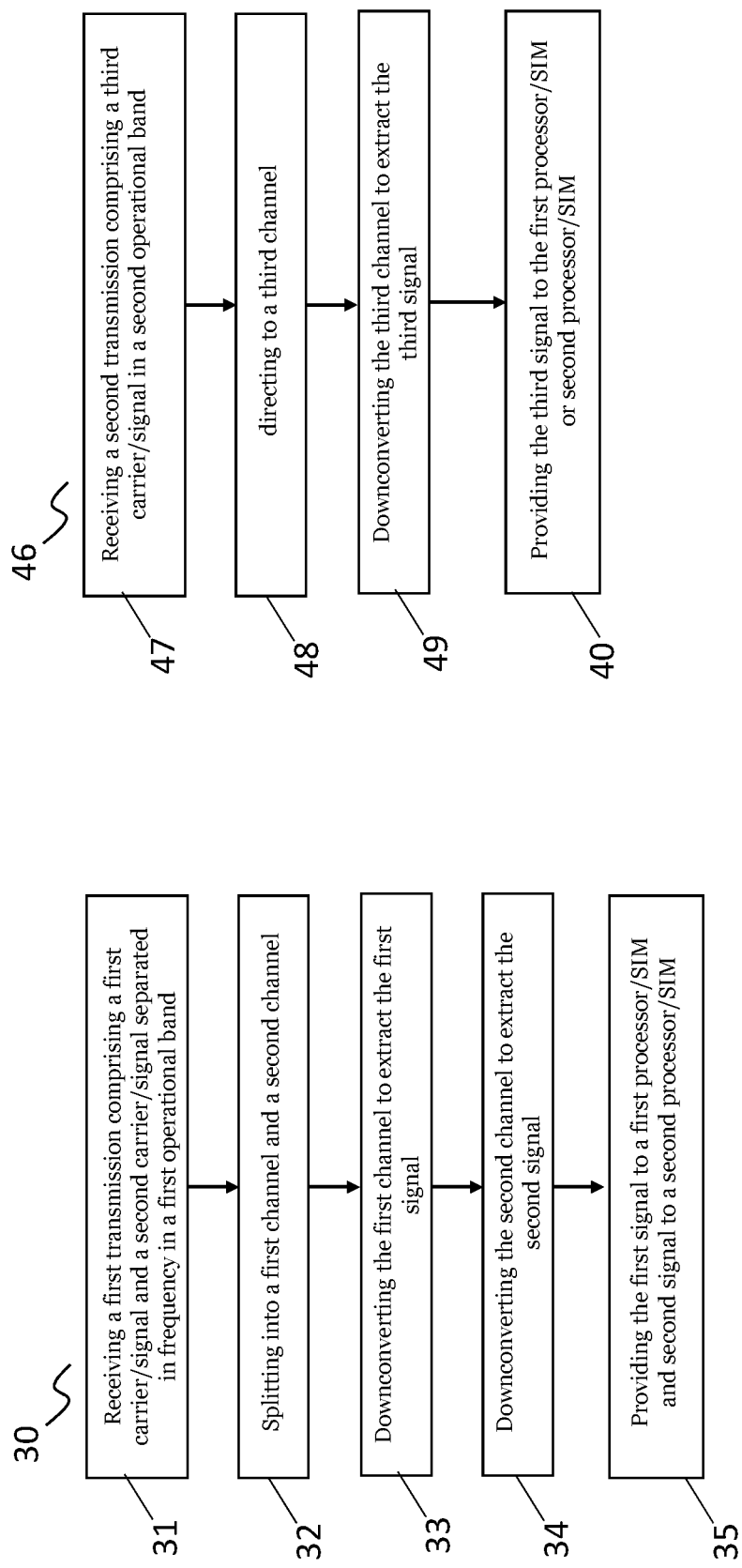
FIG. 3 is a flow diagram indicating processing operations that may be performed by a cellular device in accordance with an example embodiment.
FIG. 4 is a flow diagram indicating processing operations that may be performed by a cellular device in accordance with an example embodiment.

FIG. 3 is a flow diagram indicating processing operations 30 that may be performed by a cellular device (which may be the same or similar to device 22 in FIG. 2) in accordance with an example embodiment. The processing operations may be performed by hardware, software, firmware or a combination thereof.

A first operation 31 comprises receiving a first transmission from an antenna, the first transmission comprising a first carrier (e.g. the first carrier 1) including a first signal and a second carrier (e.g. the second carrier 2) including a second signal, wherein the first and second carriers are separated in frequency within a first operational band.

A second operation 32 comprises splitting the first transmission into a first channel and a second channel.

A third operation 33 comprises converting (i.e. downconverting) the first carrier of the first channel to a baseband frequency to extract the first signal.

A fourth operation 34 comprises converting (i.e. downconverting) the second carrier of the second channel to a baseband frequency to extract the second signal.

A fifth operation 35 comprises providing the first signal to a first processor (e.g. the processor 25) and the second signal to a second processor (e.g. the processor 26); wherein the first and second processors are associated with first and second subscriber identity modules respectively.

FIG. 4 is a flow diagram indicating processing operations 46 that may be performed by a cellular device (which may be the same or similar to device 22 in FIG. 2) in accordance with an example embodiment. The processing operations may be performed by hardware, software, firmware or a combination thereof.

A first operation 47 comprises receiving a second transmission comprising a third carrier including a third signal in a second operational band.

A second operation 48 comprises directing the third carrier to a third channel.

A third operation 49 comprises converting (i.e. downconverting) the third channel to a baseband frequency to extract the third signal.

A fourth operation 40 comprises providing the third signal to the first processor or second processor.

Figure 5:
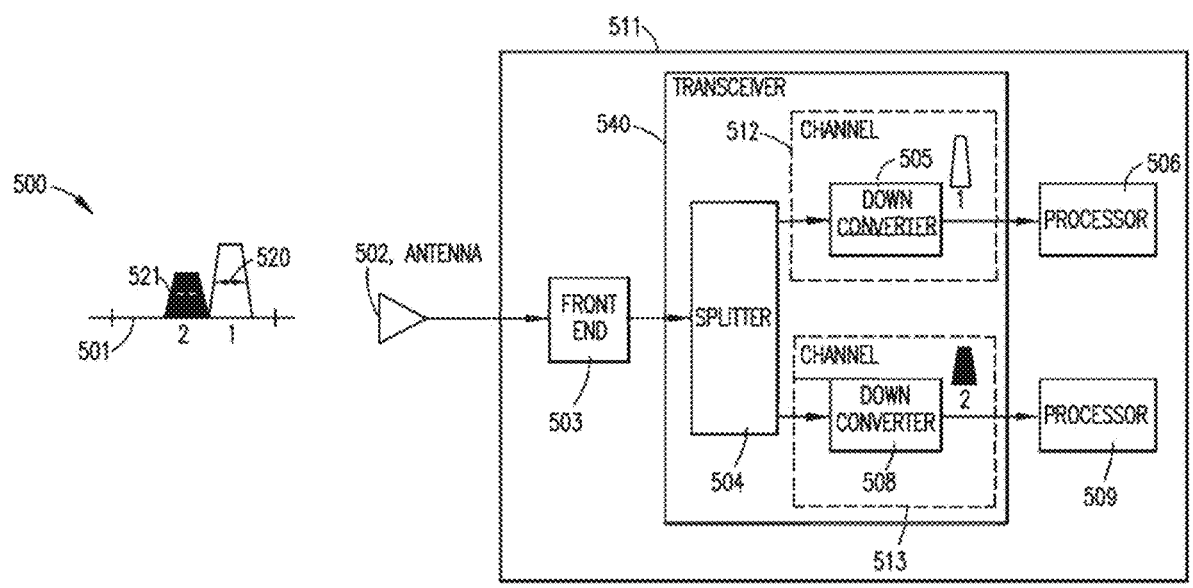
FIG. 5 is a schematic diagram showing an apparatus receiving a transmission in accordance with an example embodiment.

FIG. 5 is a schematic diagram showing an apparatus 511 (which may be a dual-SIM cellular device) receiving a transmission 500 in accordance with an example embodiment. The device 511 comprises an antenna 502, a front end module 503 and a transceiver 540. The transmission 500 comprises the first carrier 1 described above (which includes the first signal) and the second carrier 2 described above (which includes the second signal). The first carrier 1 and second carrier 2 are separated in frequency within an operational band 501. The first carrier 1 comprises a first channel bandwidth 520. The second carrier 2 comprises a second channel bandwidth 521. The first and second channel bandwidths may be the same or different and may be a regular or irregular channel bandwidth. The first and the second carrier may be the same or different received power level, different timing and/or different scheduling. The second carrier 2 may be provided by the same or different network operator(s) as the first carrier 1. The antenna 502 and front end module 503 receive the transmission 500. The output of the front end module 503 is directed to the transceiver 540. The transceiver 540 comprises a splitter 504 which splits the output of the front end module into a first channel 512 and a second channel 513. The first channel 512 comprises a downconverter 505 configured to centre the centre frequency of the first carrier at a baseband or Intermediate Frequency (IF); thus extracting the first signal. A processor 506 associated with a first SIM card (not shown) receives the extracted first signal. The second channel 513 comprises a downconverter 508 configured to centre the centre frequency of the second carrier at a baseband or Intermediate Frequency (IF); thus extracting the second signal. A processor 509 associated with a second SIM card (not shown) receives the extracted second signal.

Figure 6:
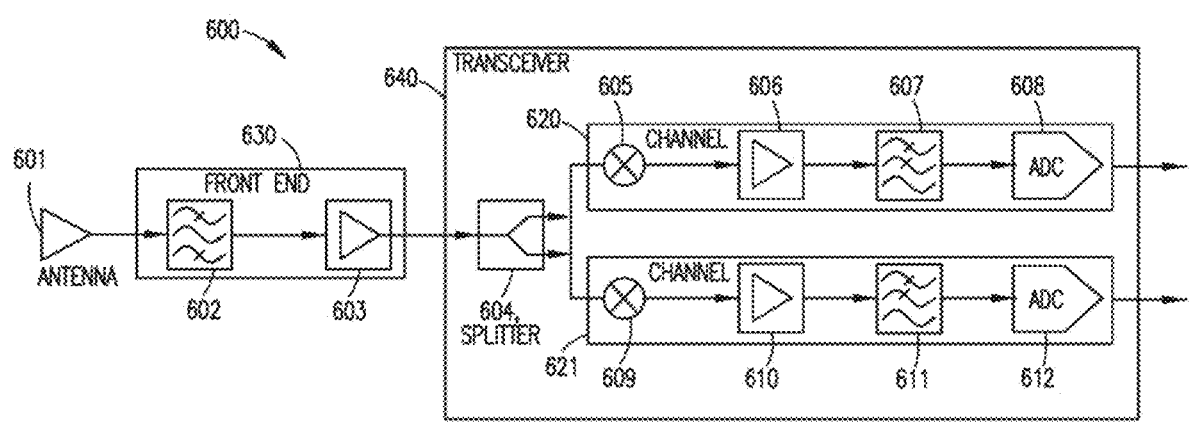
FIG. 6 is a schematic diagram showing an apparatus, in accordance with an example embodiment.

FIG. 6 is a schematic diagram showing an apparatus (which may be a dual-SIM cellular device), indicated generally by the reference numeral 600, in accordance with an example embodiment. The device 600 comprises an antenna 601, a front end module 630 (which may be the same or similar to 603) and a transceiver 640 (which may be the same or similar to 640). The device 600 is configured to receive a transmission (not shown) comprising a first carrier (e.g. the carrier 1) comprising a first signal and a second carrier (e.g. the carrier 2) comprising a second signal. The first and second carriers/signals having different centre frequencies within an operational band. The first carrier comprising a first channel bandwidth. The second carrier comprising a second channel bandwidth. The first and second channel bandwidth may be the same or different and may be a regular or irregular channel bandwidth. The first and the second carrier may be the same or different received power level, different timing and/or different scheduling. The antenna 601 directs the received transmission to the front end module 630 which comprises a bandpass filter (or part of a duplex filter) 602 having a pass band as the operational band for UE reception. The output of the bandpass filter 602 is directed to a Low Noise Amplifier (LNA) 603. The output of the front end module 630 is directed to the transceiver 640.

The transceiver 640 comprises a Radio Frequency (RF) splitter/divider 604 which divides the output to a first channel 620 and a second channel 621. The first channel 620 comprises a RF mixer 605 configured to downconvert the centre frequency of the first channel 620 to a baseband or IF. Downconversion is typically achieved by mixing the transmission with a Local Oscillator (LO) (not shown) to output the signal at baseband or IF. The baseband/IF signal may then be directed through an operational amplifier 606 to control the gain of the baseband/IF signal and a configurable analogue low pass filter 607. The configurable analogue low pass filter 607 is configured to filter out the second carrier/signal from the transmission and output the extracted first carrier/signal. The first signal is then processed by an Analogue-to-Digital Converter (ADC) 608 to output a first digital signal for a first processor (not shown) associated with a first SIM card (not shown). Similarly, the second channel 621 comprises a RF mixer 609 configured to downconvert the centre frequency of the second channel 621 to a baseband or IF. The baseband/IF signal may then be directed through an operational amplifier 610 to control the gain of the baseband/IF signal and a configurable analogue low pass filter 611. The configurable analogue low pass filter 611 is configured to filter out the first carrier/signal from the transmission and output the extracted second carrier/signal. The second signal is then processed by an ADC (612) to output a second digital signal for a second processor (not shown) associated with a second SIM card (not shown).

Figure 7:
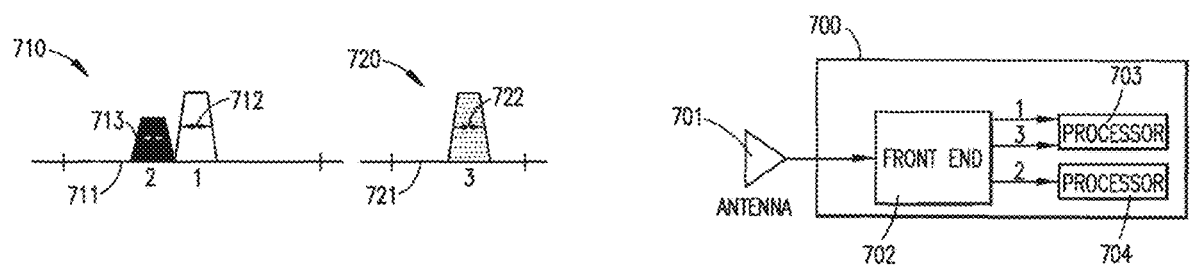
FIG. 7 is a schematic diagram showing an apparatus receiving a first transmission and a second transmission, in accordance with an example embodiment.

FIG. 7 is a schematic diagram showing an apparatus (which may be a dual-SIM cellular device) 700 receiving a first transmission 710 and a second transmission 720, in accordance with an example embodiment. The first transmission 710 comprises the first carrier 1 (which includes the first signal) and the second carrier 2 (which includes the second signal). The first carrier 1 are second carrier 2 are separated in frequency within a first operational band 711. The first carrier 1 comprises a first channel bandwidth 712. The second carrier 2 comprises a second channel bandwidth 713. The second transmission 720 comprises a third carrier 3 having a frequency in a second operational band 721. The third carrier 3 comprises a third channel bandwidth 722. The first 712, second 713 and third 722 channel bandwidths may be the same or different and may be a regular or irregular channel bandwidth. The third carrier 3 may be provided by the same network operator as either the first or second carrier 1, 2 or both. The third carrier 3 may be scheduled with either the first or second carrier 1, 2 or both. The cellular device 700 comprises an antenna 701 which receives the first transmission 710 and second transmission 720 and directs them to a front end module/transceiver 702. In DSDS operation, the front end module 702 is configured to separate carriers in at least two separated operational bands such as carriers 1, 2 and 3. At least one of the operational bands may comprise more than one carrier; such as carriers 1 and 2. The front end module 702 is arranged to provide the carriers to the transceiver 702 for DSDS operation. The front end module/transceiver 702 extracts the first signal from the first carrier 1 and directs the first signal to a first processor 703 which is associated with a first SIM card. The front end module/transceiver 702 further extracts the second signal from the second carrier 2 and directs the second signal to a second processor 704 which is associated with a second SIM card. The front end module/transceiver 702 further extracts the third signal from the third carrier 3 and directs the third signal to either the first processor 703 or second processor 704 (the first processor in the example embodiment shown in FIG. 7) based on the relation to the subscriber of the third carrier.

Figure 8:
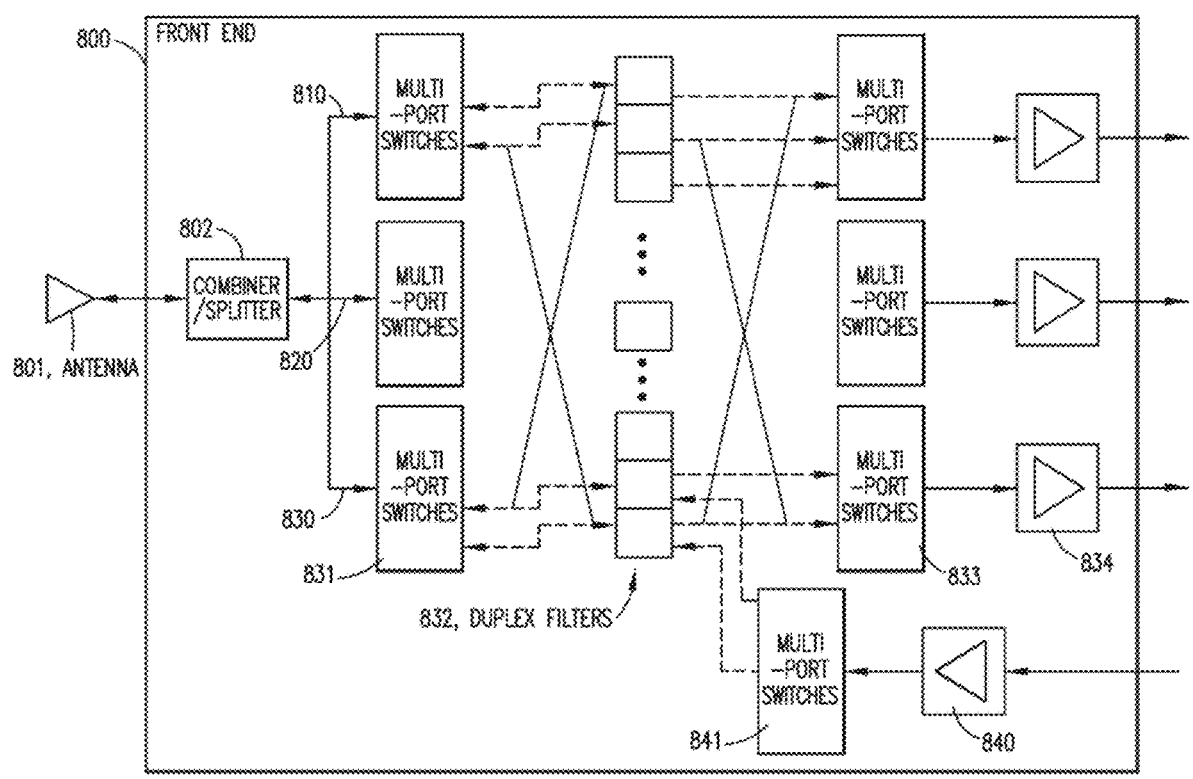
FIG. 8 is a schematic diagram showing a front end module, in accordance with an example embodiment.

FIG. 8 is a schematic diagram showing a front end module 800 in accordance with an example embodiment. Front end module 800 may be the same or similar to front end module 702 in relation to FIG. 7. The front end module 800 is connected to an antenna 801 for transmission and reception of one or more carriers. The antenna 801 is connected to a 3-way combiner/splitter 802 configured to combine/split a transmitted/received carrier from/to three paths 810, 820 and 830. Each path 810, 820 and 830 further comprises a first multi-port switch 831 arranged to direct the transmitted/received carrier from/to one of a set of duplex filters 832 according to the carrier frequency. Each duplex filter 832 comprises a pair of narrowband filters for the transmit and receive carriers.

In receive, each path 810, 820 and 830 comprises a second multi-port switch 833 arranged to direct the filtered carrier from the respective duplex filter 832 to a LNA 834 before outputting the carrier for a transceiver (not shown).

In transmit, a transmitted carrier from a transceiver (not shown) is passed through a Power Amplifier (PA) 840 and a third multi-port switch 841. The multi-port switch 841 is configured to direct the transmitted carrier to the corresponding duplex filter 832 and path 810, 820 and 830 according to the transmitted carrier frequency. In a similar manner to receive, the transmitted carrier is directed through the corresponding multi-port switch 831, the combiner 802 and emitted out of the antenna 801.

For clarity, each cable connection between the multi-port switches 831, 833, 841 and duplexers 832 have not been illustrated or labelled. Instead crosses with dashed lines indicate that the switches 831, 833 and duplexers 832 are connected. Similarly, for clarity, multi-port switches 831, 833, duplexers 832 and LNA 834 have only been labelled in the 830 path.

In some embodiments, the 3-way combiner/splitter 802 is a triplexer configured to combine/split a transmitted/received carrier from/to three paths 810, 820 and 830, wherein the triplexer comprises three bandpass filters with different passbands. In some embodiments, the triplexer may cover a 3GPP frequency range (such as the lowband group) wherein each bandpass filter covers a specific bandgroup (i.e. a group of 3GPP operational bands) and each duplex filter may cover a different transmit/receive operational band. In some embodiments, received carriers comprising a regular channel bandwidth are routed through one or more of paths 810, 820 and/or 830 to regular band supporting receiver chains in the transceiver. In some embodiments, received carriers comprising an irregular channel bandwidth are routed through one or more of paths 810, 820 and/or 830 to irregular band supporting receiver chains in the transceiver.

In some embodiments, the front end module 800 is configured for receive only thus does not provide a transmission path and the receive paths 810, 820, 830 comprise bandpass filters in place of the duplex filters 832.

Figure 9:
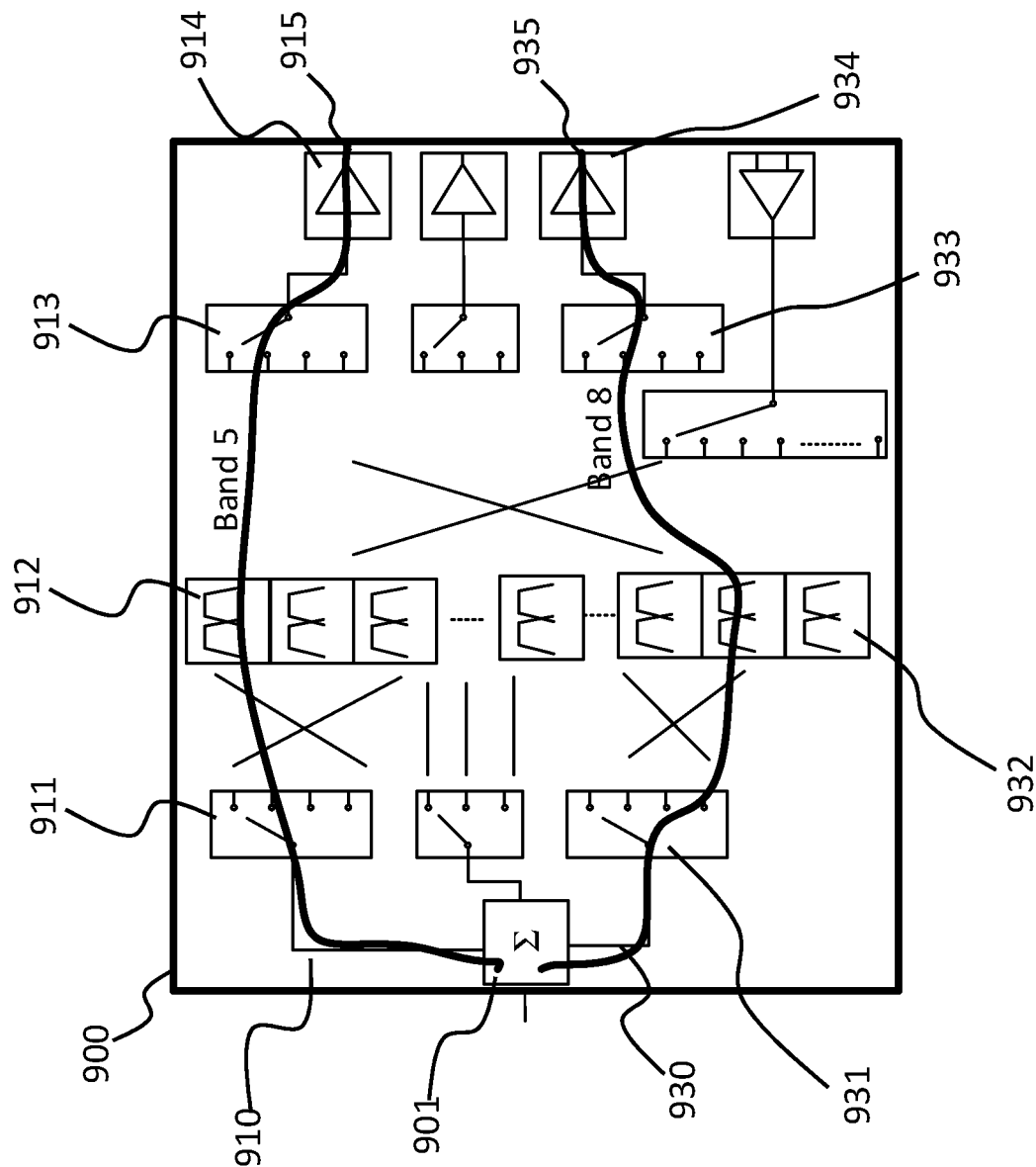
FIG. 9 is a schematic diagram showing a front end module in accordance with an example embodiment.

FIG. 9 is a schematic diagram showing a front end module 900 in accordance with an example embodiment. Front end module 900 may be the same or similar to all or part of front end module 800. A first carrier in the 3GPP operational band 5 is received by front end module 900; the carrier is referenced by 915. The carrier 915 is split by splitter 901 to path 910. A multi-port switch 911 is configured to direct the carrier 915 to a duplexer 912 corresponding to operational band 5. A second multi-port switch 913 directs the carrier 915 to a LNA 914 for a transceiver (not shown). A second carrier in the 3GPP operational band 8 is received by the front end module 900; the carrier is referenced by 935. The carrier 935 is split by splitter 901 to path 930. A multi-port switch 931 is configured to direct the carrier 935 to a duplexer 932 corresponding to operational band 8. A second multi-port switch 933 directs the carrier 935 to a LNA 934 for a transceiver (not shown).

Figure 10:
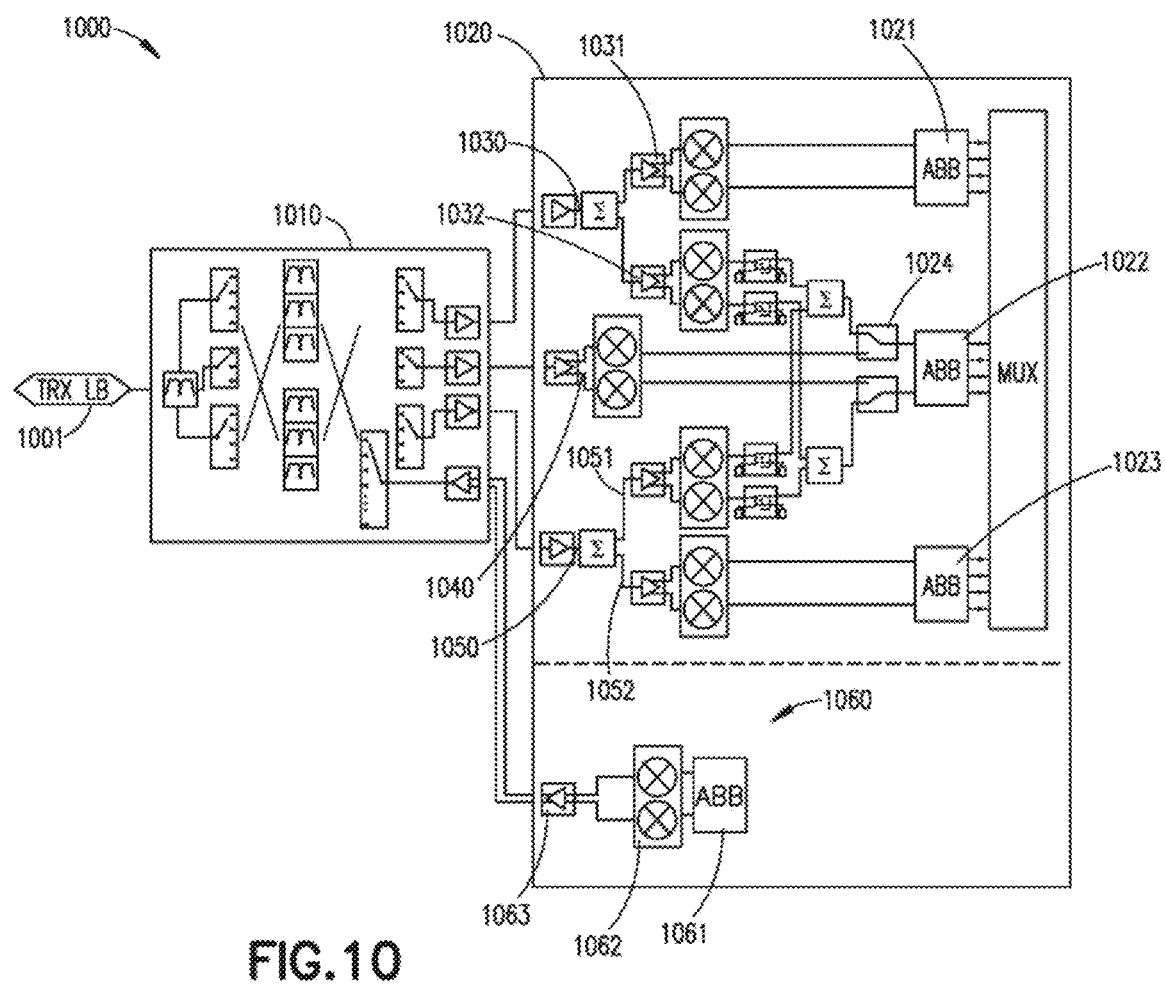
FIG. 10 is a schematic diagram showing an apparatus in accordance with an example embodiment.

FIG. 10 is a schematic diagram showing an apparatus (which may be a dual SIM-cellular device) 1000 in accordance with an example embodiment. The apparatus 1000 comprises a front end module 1010 and a transceiver 1020. The apparatus 1000 is configured to support receive and transmit for two SIM cards in DSDS mode at Lowband frequencies, providing up to three carriers for carrier aggregation or dual connectivity for each SIM card and support irregular channel bandwidths. An antenna (not shown) is connected to the input 1001 of the front end module 1010. The front end module 1010 may be the same or similar to front end module 800 or 900.

The front end module 1010 comprises a triplexer thus received carriers in different operational bands are separated by the front end module 1010 (as discussed above in relation to FIGS. 8 and 9). The filtered carriers are provided to the transceiver 1020. The transceiver 1020 comprises three receive paths 1030, 1040, 1050. Each receive path 1030, 1040, 1050 comprises mixers arranged to downconvert received carriers to a baseband frequency or IF. Receive path 1030 further separates carriers within the same operational bands into two separate channels 1031, 1032 (as discussed above in relation to FIGS. 5 and 6). Similarly, receive paths 1050 further separates carriers within the same operational bands into two separate channels 1051, 1052. Separated carriers are provided to one of three Analogue BaseBand (ABB) units 1021, 1022, 1023. An ABB may comprise one or all of a LNA, a LPF and a Variable Gain Amplifier (VGA). The outputs of the ABBs 1021, 1022, 1023 are fed into a multiplier (MUX) before being converted to digital and processed by a processor associated with a SIM card. ABB 1022 is shared by channels 1032, 1051 and path 1040 using a pair of switches 1024.

The transceiver 1020 further comprises a transmitter 1060. The transmitter 1060 comprises an ABB unit 1061, upconverters 1062 and a VGA 1063. A transmitted carrier is fed into the front end module 1010 for transmission as discussed previously in relation to FIG. 8.

Figure 11:
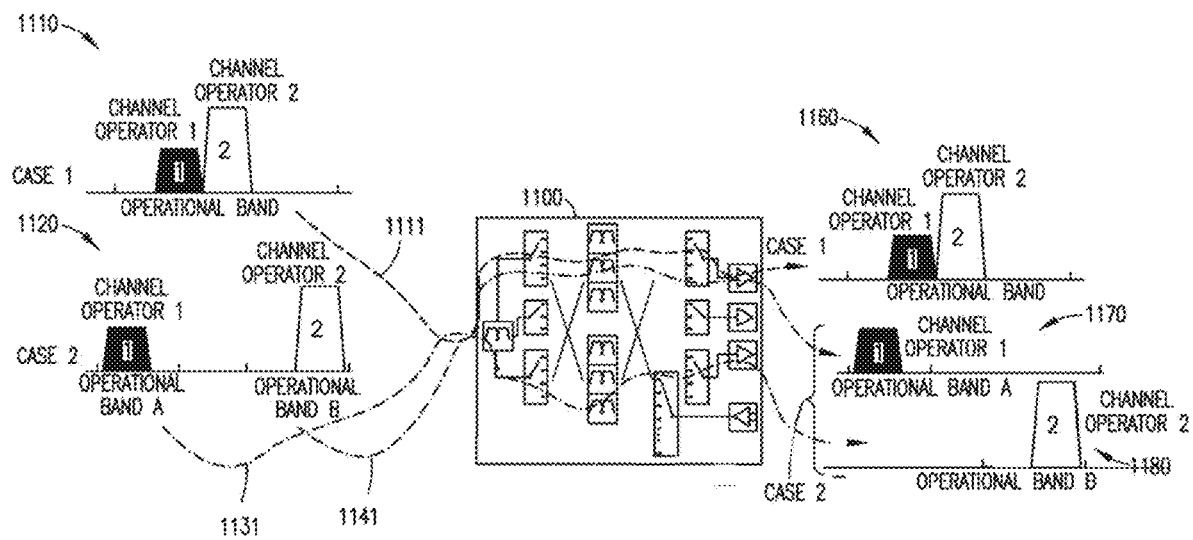
FIG. 11 is a schematic diagram showing a front end module in accordance with an example embodiment.

FIG. 11 is a schematic diagram showing a front end module 1100 in accordance with an example embodiment. The front end module 1100 may be the same or similar to 1010 in FIG. 10.

In a first case, the front end module 1100 receives transmission 1110 comprising two carriers (carriers 1 and 2) within the same operational band. The carriers 1 and 2 may be provided by the same or different network operators. An arrow 1111 illustrates the path of the carriers 1 and 2 through the front end module 1100. Because the carriers 1 and 2 are within the same operational band, both carriers 1 and 2 are directed through one of the three paths in the front end module 1100; as determined by the triplexer as described previously in relation to FIGS. 8 and 9. Thus, the front end module 1100 outputs an output 1160 comprising both carriers 1 and 2 through an output port.

In a second case, the front end module 1100 receives a transmission 1120 comprising two carriers 1 and 2 in different operational bands. Carrier 1 in operational band A and carrier 2 1140 in operational band B. The carriers 1 and 2 may be provided by the same or different network operators. Arrow 1131 illustrates carrier 1 propagates through one of the three paths of the front end module 1100. Arrow 1141 illustrates that carrier 2 propagates through a different path to carrier 1. The paths of the carriers 1 and 2 being determined by the triplexer as previously described. Thus, the front end module 1100 outputs a first output 1170 comprising carrier 1 through a first output port and a second output 1180 comprising carrier 2 through a second output port.

Figure 12:
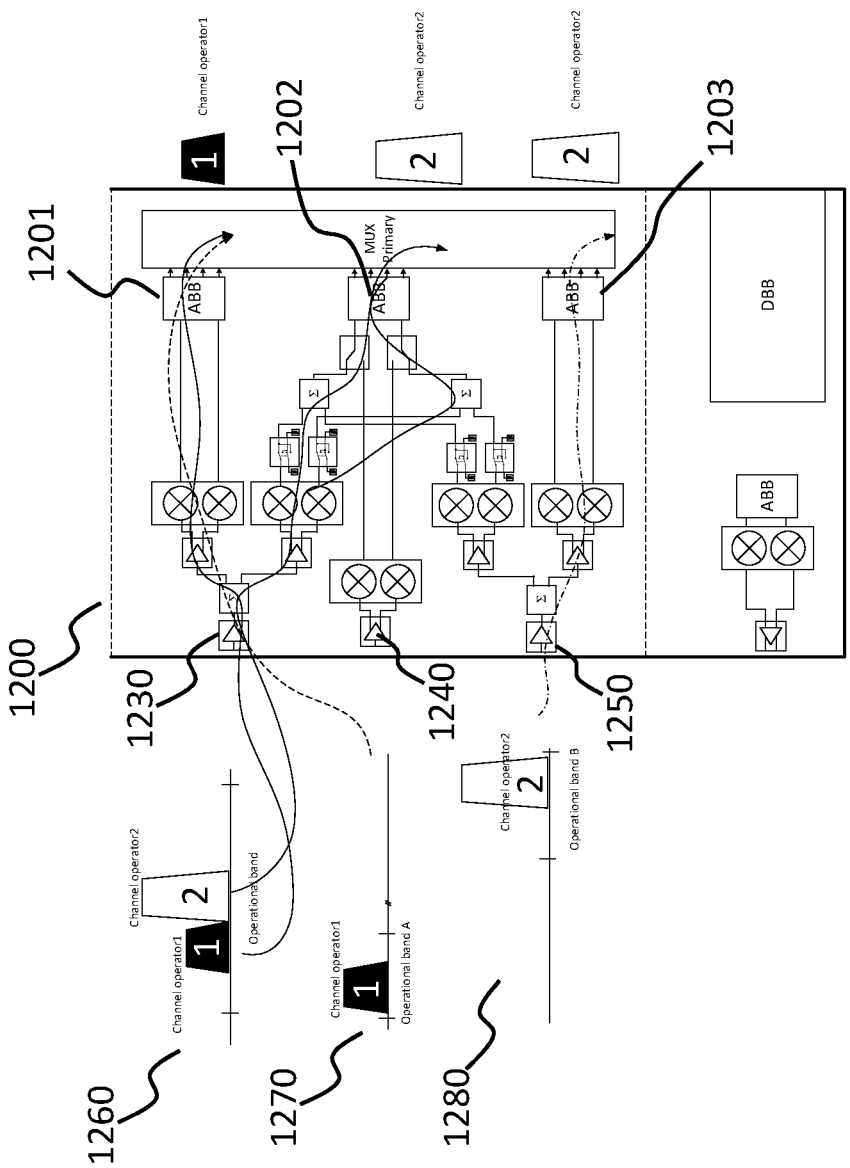
FIG. 12 is a schematic diagram showing a transceiver in accordance with an example embodiment.

FIG. 12 is a schematic diagram showing a transceiver 1200 in accordance with an example embodiment. The transceiver 1200 may be the same or similar to 1020 in FIG. 10.

In a first case, an output 1260 of a front end module (which may be the same or similar to front end module 1100 in relation to FIG. 11) is fed into path 1230 of the transceiver 1200. The output 1260 comprises carriers 1 and 2 in the same operational band. The carriers 1 and 2 are separated into two channels and separately downconverted to a baseband frequency for extraction by separate ABB units 1201 and 1202 respectively.

In a second case, outputs 1270 and 1280 of a front end module (which may be the same or similar to front end module 1100 in relation to FIG. 11) are fed into paths 1230 and 1250 of the transceiver 1200 respectively. Output 1270 comprises carrier 1 and output 1280 comprises carrier 2. Carriers 1 and 2 are in different operational bands; operational bands A and B respectively. The carriers 1 and 2 are downconverted to a baseband frequency through their respective paths for extraction by separate ABB units 1201 and 1203 respectively.

Figure 13:
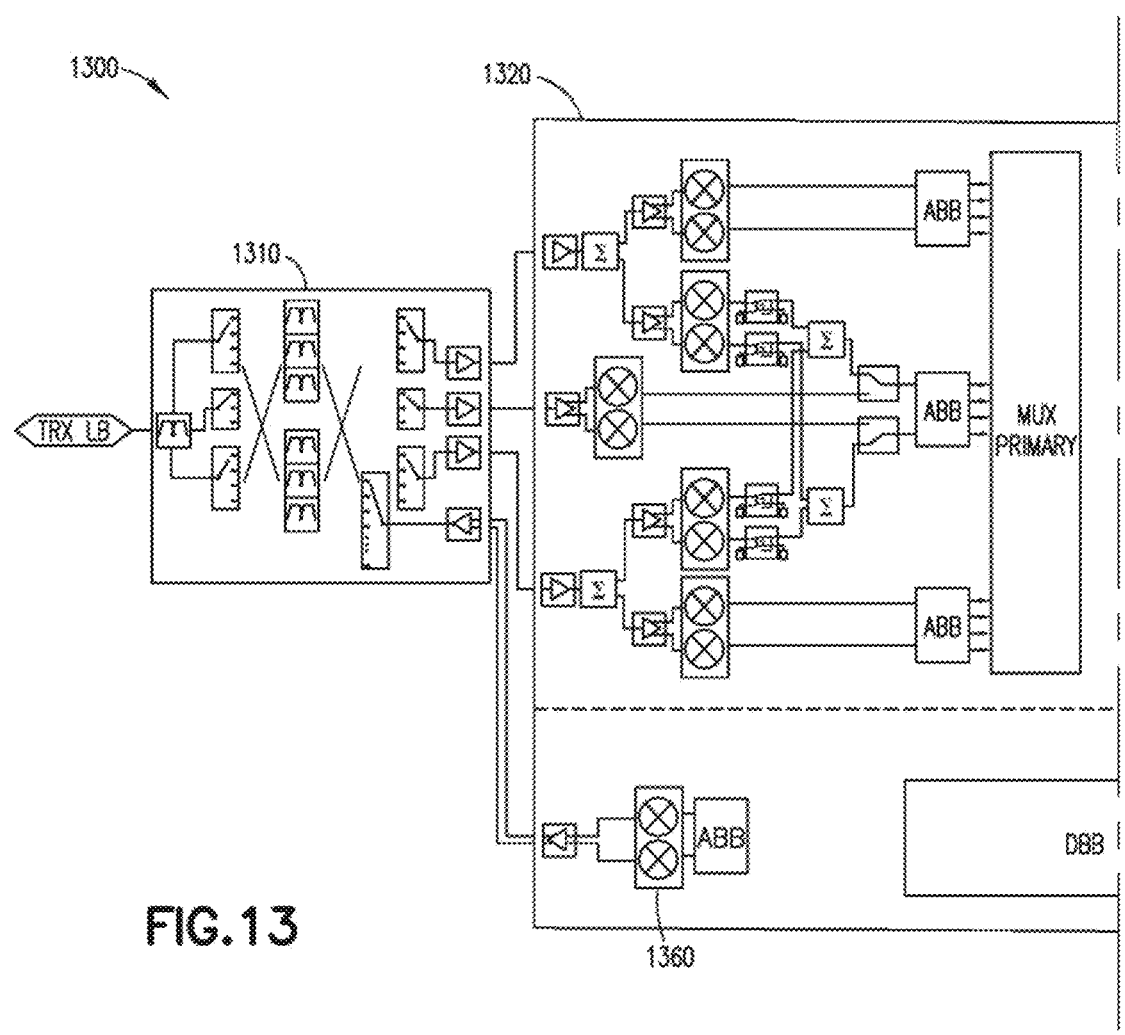
FIG. 13 is a schematic diagram showing an apparatus in accordance with an example embodiment.
Figure 13:
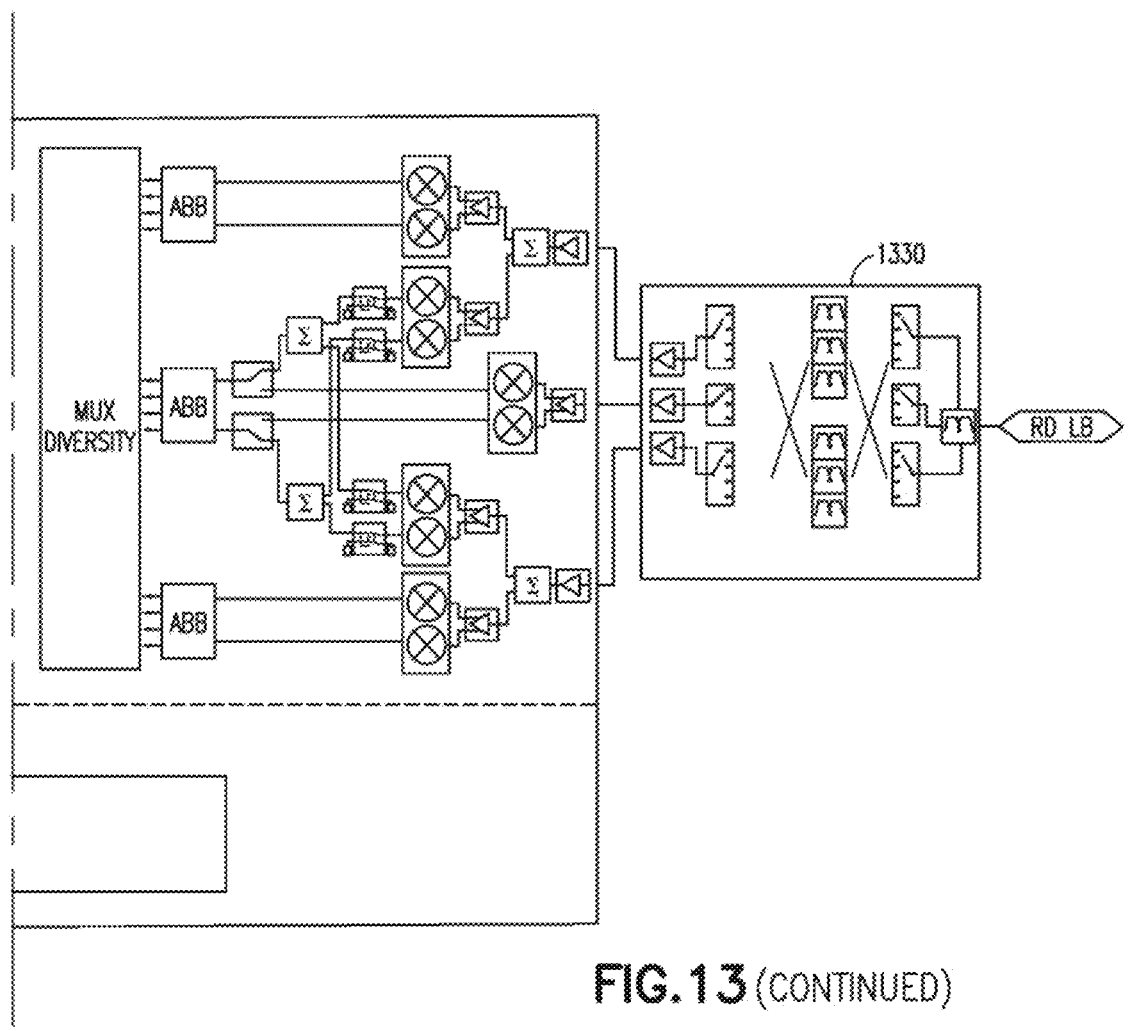

FIG. 13 is a schematic diagram showing an apparatus (which may be a dual-SIM cellular device) 1300 in accordance with an example embodiment. The apparatus 1300 comprises a first front end module 1310 (connected to a first antenna (not shown)) and a transceiver 1320 configured to support receive and transmit for two SIM cards in DSDS mode at lowband frequencies, providing up to three carriers for carrier aggregation or dual connectivity for each SIM card and support regular and irregular channel bandwidths (via dedicated paths in the front end modules); similar to apparatus moo in relation to FIG. 10.

In addition, apparatus 1300 further comprises a second front end module 1330 (connected to a second antenna (not shown)). The second front end module 1330 is configured for receive only. The second front end module 1330 may be configured to receive the same carriers as the first front end module 1310 so the signals are captured and processed twice for receive diversity. The second front end module 1330 may be the same or similar to front end module 1310. The second front end module 1330 may comprise three paths; each path comprises a set of bandpass filters corresponding to the operational bands supported by that path.

The transceiver 1320 further comprises a transmitter 1360; which may be the same or similar to transmitter 1060 in relation to FIG. 10. The carrier transmitted by the transmitter 1360 is directed to the first front end module 1310 before being emitted out of the first antenna.

Figure 14:
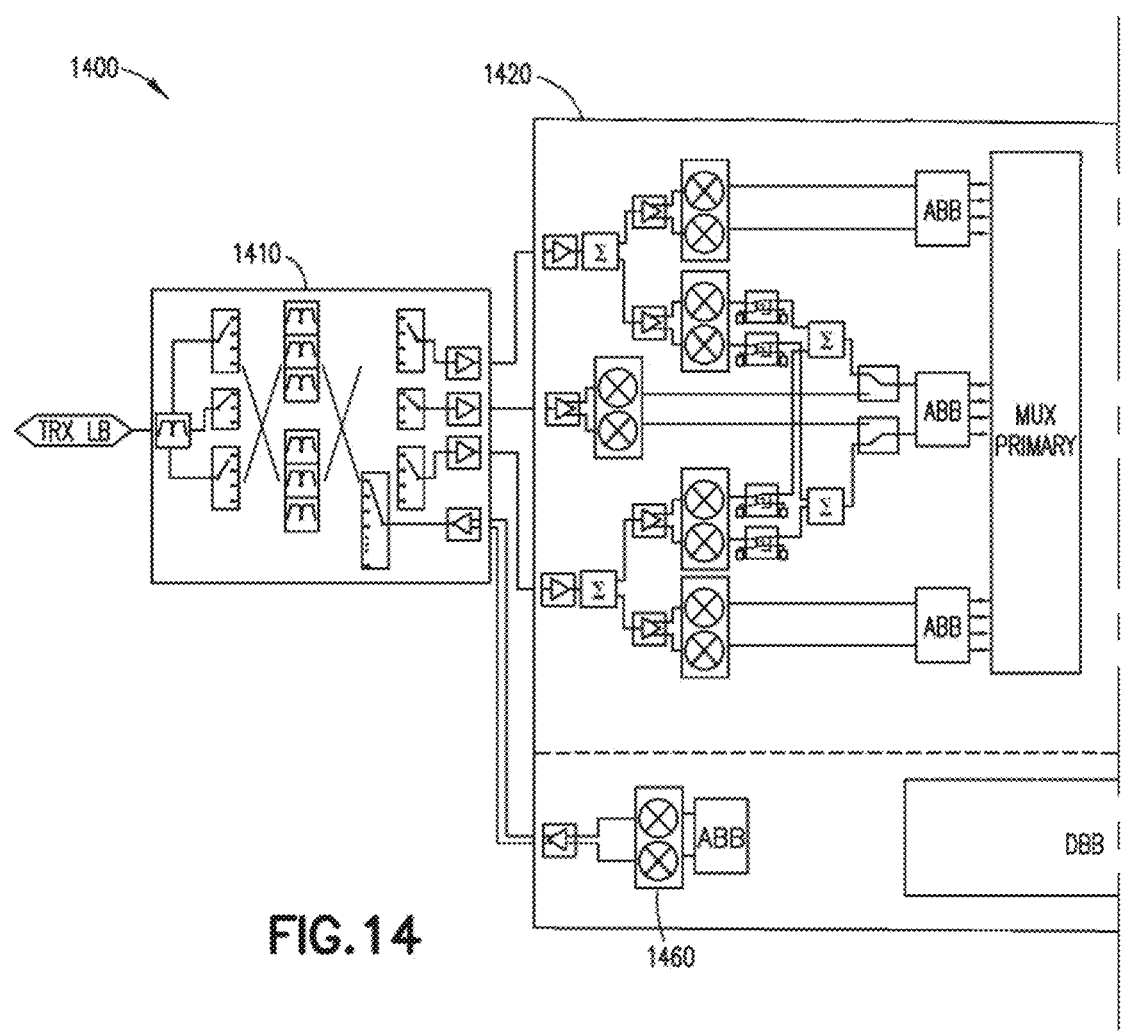
FIG. 14 is a schematic diagram showing an apparatus in accordance with an example embodiment.
Figure 14:
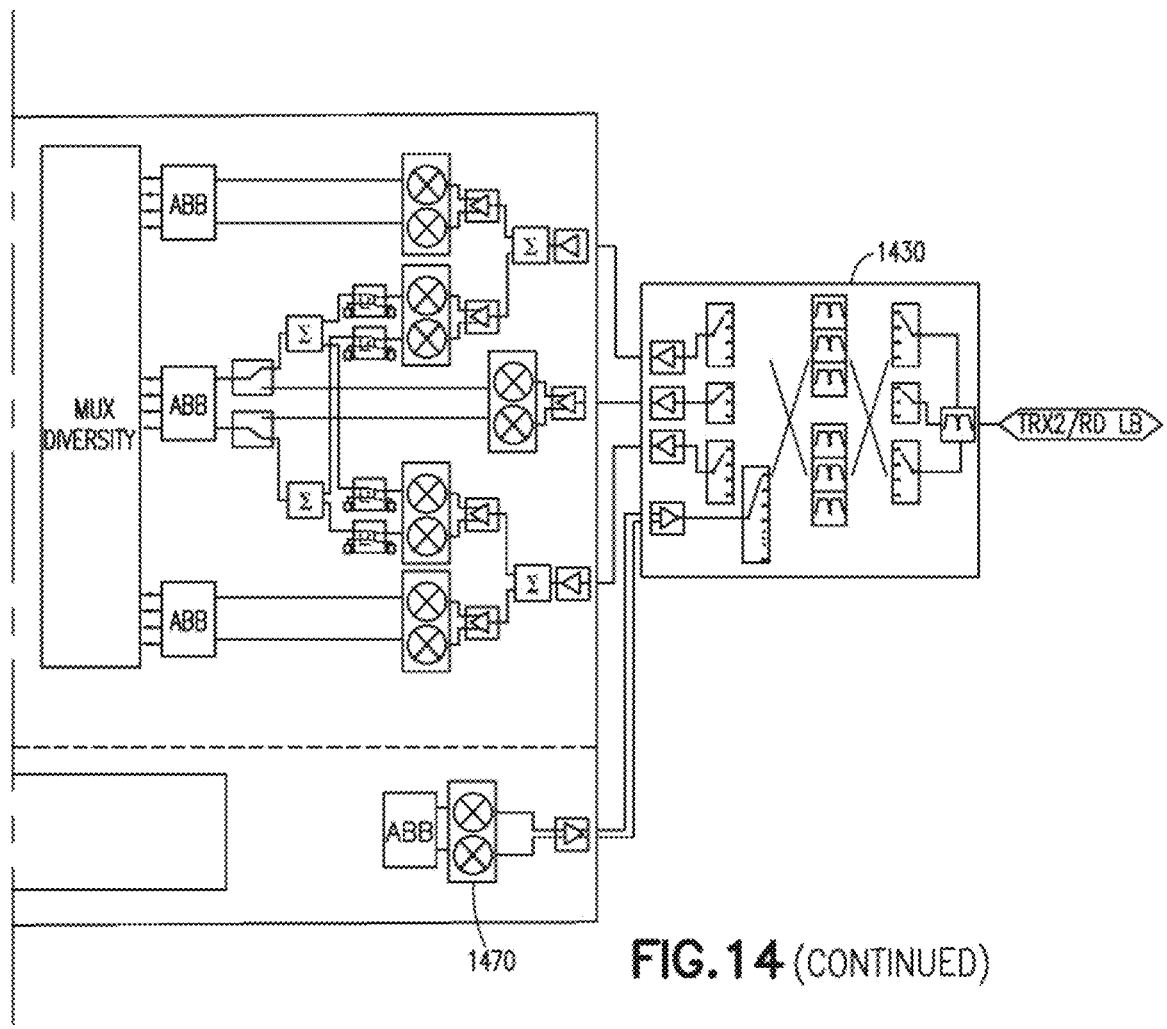

FIG. 14 is a schematic diagram showing an apparatus (which may be a dual-SIM cellular device) 1400 in accordance with an example embodiment. The apparatus 1400 comprises a first front end module 1410 (connected to a first antenna (not shown)), a second front end module 1430 (connected to a second antenna (not shown)) and a transceiver 1420. The apparatus 1400 is configured to support receive and transmit for two SIM cards in DSDA mode at lowband frequencies, providing up to three carriers for carrier aggregation or dual connectivity for each SIM card, support for regular and irregular channel bandwidths (via dedicated paths in the front end modules) and support for receive diversity; similar to apparatus 1300 in relation to FIG. 13.

In order to support DSDA, the transceiver 1420 further comprises a first transmitter 1460; which may be the same or similar to transmitter 1360 in relation to FIG. 13 and a second transmitter 1470. The carrier transmitted by the first transmitter 1460 is directed to the first front end module 1410 before being emitted out of a first antenna; as previously described. The carrier transmitted by the second transmitter 1470 is directed to the second front end module 1430 before being emitted out of a second antenna; in a similar manner to the carrier transmitted by the first transmitter 1460.

In some embodiments, the first front end module 1410 and second front end module 1430 are the same. In some embodiments, the first transmitter 1460 is controlled by a first processor and the second transmitter 1470 is controlled by a second processor (not shown); wherein the first and second processors are associated with first and second SIM cards respectively (not shown).

Figure 15:
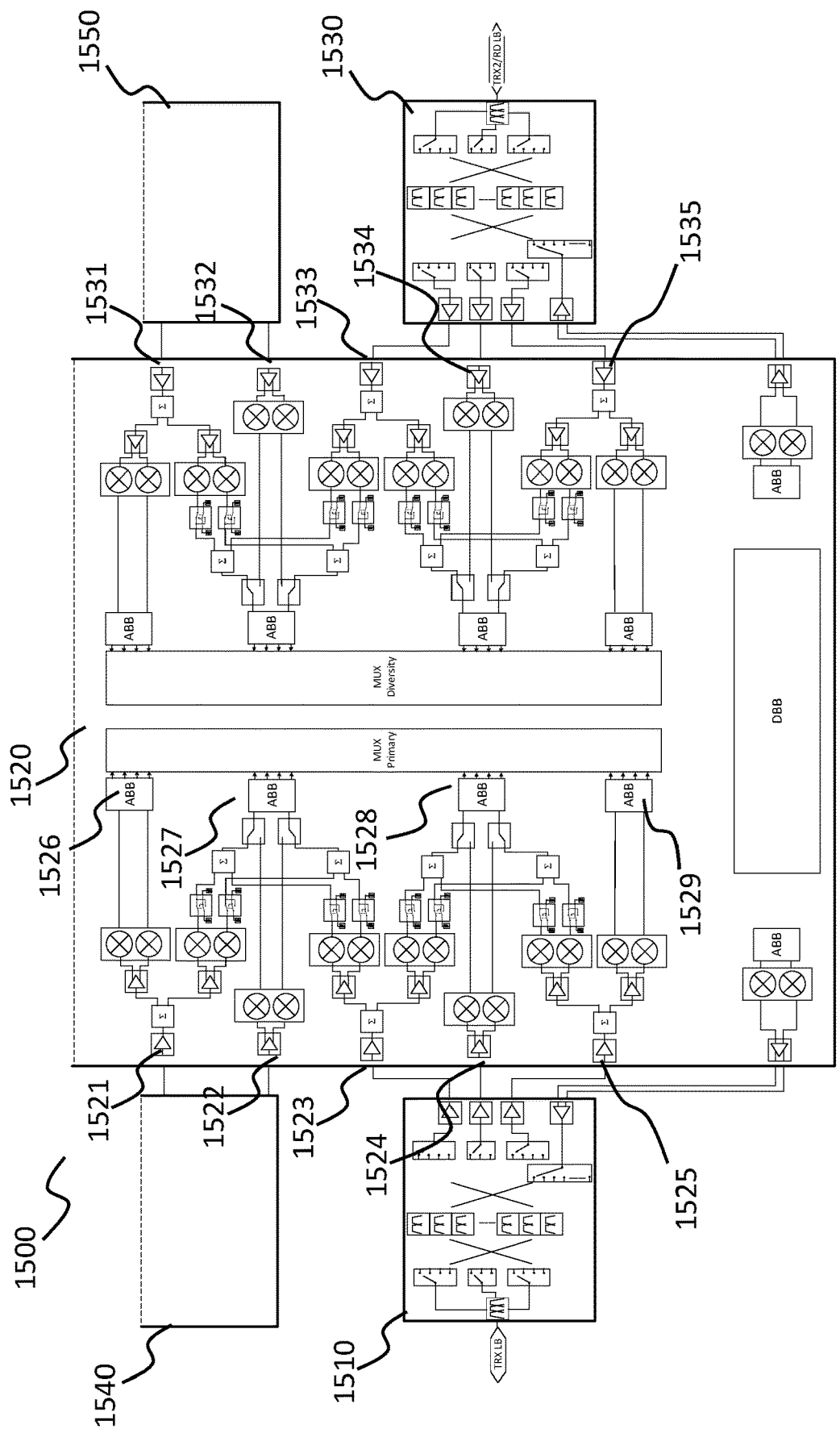
FIG. 15 is a schematic diagram showing an apparatus in accordance with an example embodiment.

FIG. 15 is a schematic diagram showing an apparatus (which may be a dual-SIM cellular device) 1500 in accordance with an example embodiment. The apparatus 1500 comprises a first front end module 1510 (connected to a first antenna (not shown)), a second front end module 1530 (connected to a second antenna (not shown)) and a transceiver 1520. The apparatus 1500 is configured to support receive and transmit for two SIM cards in DSDA mode at lowband frequencies, providing up to three carriers for carrier aggregation or dual connectivity for each SIM card, support for regular and irregular channel bandwidths (via dedicated paths in the first front end module 1510) and support for receive diversity.

The first front end module 1510, connected to a first antenna (not shown), is configured to operate at lowband and comprises three output ports connected to three paths 1523, 1524, 1525 of the transceiver 1520. Furthermore, each path 1523, 1524, 1525 comprises an ABB unit 1527, 1528, 1529. ABB unit 1528 is shared between paths 1523, 1524 and 1525 using a pair of switches.

The second front end module 1530, connected to a second antenna (not shown), is also configured to operate at lowband for receive diversity and comprises three output ports connected to a further three paths 1533, 1534, 1535 in the transceiver 1520. The paths 1533, 1534, 1535 may be the same or similar to paths 1523, 1524, 1525.

A third front end module 1540, connected to the first antenna, is configured to operate at mid/highband and comprises two output ports connected to two paths 1521, 1522 of the transceiver 1520. Each path 1521, 1522 comprises an ABB unit 1526, 1527. Thus, ABB unit 1527 is shared between paths 1521, 1522 and 1523 using an additional pair of switches.

A fourth front end module 1550, connected to the second antenna, is configured to operate at mid/highband for receive diversity and comprises two output ports connected to a further two paths 1531 and 1532 in the transceiver 1520. The paths 1531, 1532 may be the same or similar to paths 1521, 1522.

The third and fourth front end modules 1540 and 1550 are configured to support receive only for the two SIM cards in DSDS mode at mid/highband, providing up to two carriers for carrier aggregation or dual connectivity for each SIM card and support for receive diversity.

Figure 16:
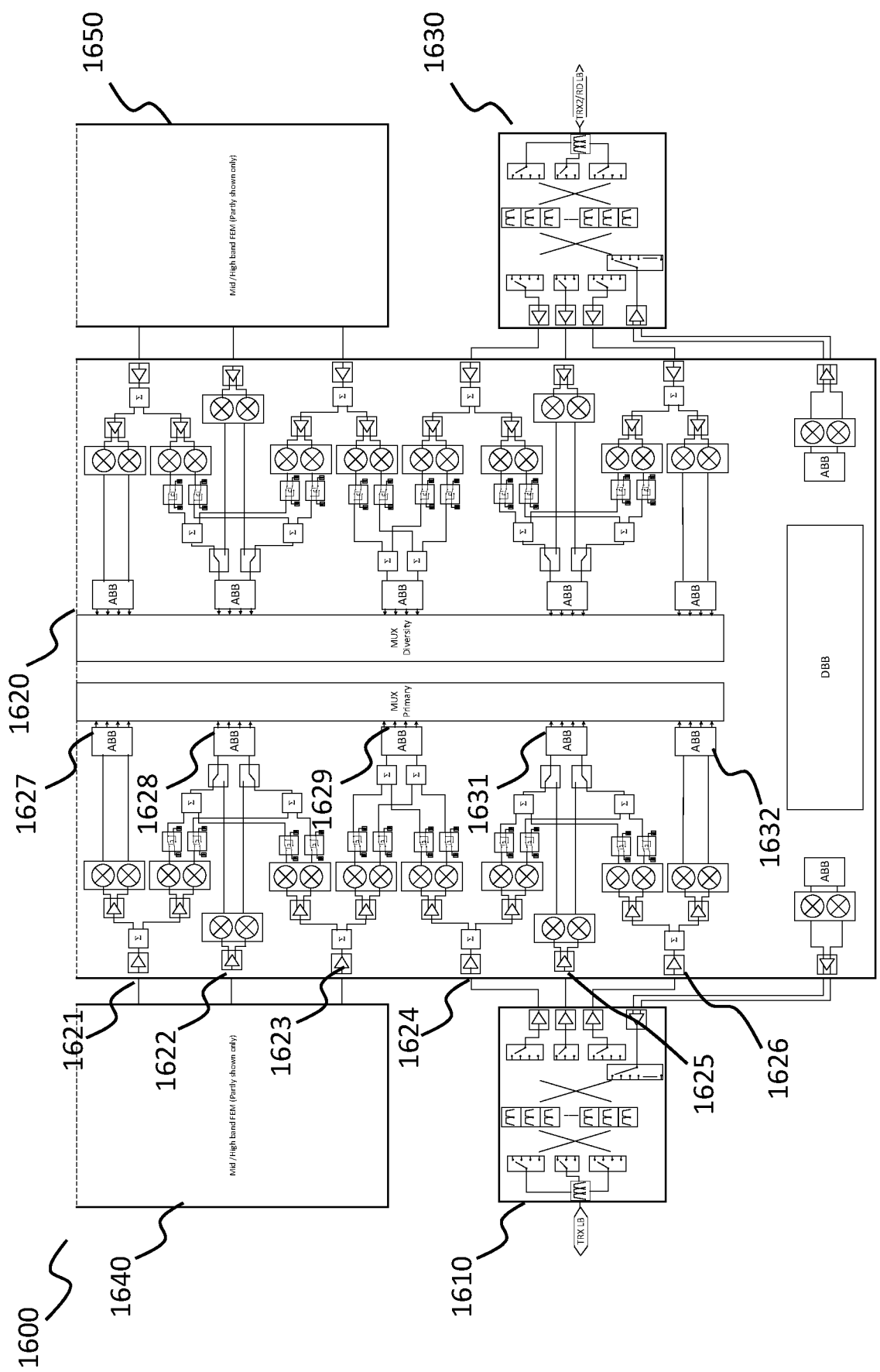
FIG. 16 is a schematic diagram showing an apparatus in accordance with an example embodiment.

FIG. 16 is a schematic diagram showing an apparatus (which may be a dual-SIM cellular device) 1600 in accordance with an example embodiment. The apparatus 1600 may be the same or similar to apparatus 1500 in relation to FIG. 15. The apparatus 1600 is configured to support receive and transmit for two SIM cards in DSDA mode in lowband and mid/highband frequencies, providing up to three carriers for carrier aggregation or dual connectivity for each SIM card in either lowband or mid/highband and up to two carriers for carrier aggregation or dual connectivity in either mid/highband or lowband, support for regular and irregular channel bandwidths (via dedicated paths in the relevant front end module) and support for receive diversity in all bands.

The first front end module 1610, connected to a first antenna (not shown), is configured to operate at lowband and comprises three output ports connected to three paths 1624, 1625, 1626 of the transceiver 1620. Furthermore, each path 1624, 1625, 1626 comprises an ABB unit 1629, 1631, 1632. ABB unit 1631 is shared between paths 1624, 1625 and 1626 using a pair of switches.

The second front end module 1630, connected to a second antenna (not shown), is also configured to operate at lowband for receive diversity and comprises three output ports connected to a further three paths in the transceiver; in a similar manner to paths 1533, 1534, 1535 described in relation to FIG. 15.

The third front end module 1640, connected to the first antenna, is configured to operate at mid/highband and comprises three output ports connected to three paths 1621, 1622, 1623 of the transceiver 1620. Each path 1621, 1622, 1623 comprises an ABB units 1627, 1628, 1629. Thus, ABB unit 1629 is shared between paths 1623 and 1624 using a pair of combiners or switches. ABB unit 1628 is shared between paths 1621, 1622 and 1623 using a pair of switches.

The fourth front end module 1650, connected to the second antenna, is configured to operate at mid/highband for receive diversity and comprises three output ports connected to a further three paths in the transceiver 1620; in a similar manner to paths 1531, 1532 described in relation to FIG. 15.

The third and fourth front end modules 1640 and 1650 are configured to support receive only for the two SIM cards in DSDS mode at mid/highband, providing up to three carriers for carrier aggregation or dual connectivity for each SIM card and support for receive diversity.

In some embodiments, any or all of the apparatus 22, 511, 600, 700, 1000, 1100, 1200, 1300, 1400, 1500, 1600 described above may be configured to operate in any of the 3GPP frequency ranges including lowband, midband and highband.

Example Apparatus

FIG. 17 shows an apparatus according to some example embodiments, which may comprise the front end module or transceiver as referred to above.

The apparatus may be configured to perform the operations described herein, for example operations described with reference to any disclosed process. The apparatus comprises at least one processor 1700 and at least one memory 1701 directly or closely connected to the processor. The memory 1701 includes at least one random access memory (RAM) 1701a and at least one read-only memory (ROM) 1701b. Instructions, e.g. computer program code (software) 1705 are stored in the ROM 1701b. When the instructions are executed by the at least one processor, they can cause the apparatus at least to perform any process disclosed herein. The apparatus may be connected to a transmitter (TX) and a receiver (RX). The apparatus may, optionally, be connected with a user interface (UI) for instructing the apparatus and/or for outputting data. The at least one processor 1700, with the at least one memory 1701 and the computer program code 1705 are arranged to cause the apparatus to at least perform at least the method according to any preceding process, for example as disclosed in relation to the flow diagrams of FIGS. 3 and/or 4 and related features thereof.

FIG. 18 shows a non-transitory media 1800 according to some embodiments. The non-transitory media 1800 is a computer readable storage medium. It may be e.g. a CD, a DVD, a USB stick, a blue ray disk, etc. The non-transitory media 1800 stores computer program code, causing an apparatus to perform the method of any preceding process for example as disclosed in relation to the flow diagrams and related features thereof.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi.

A memory may be volatile or non-volatile. It may be e.g. a RAM, a SRAM, a flash memory, a FPGA block ram, a DCD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered as some embodiments. However, it should be noted that the description of such embodiments is given by way of example only and that various modifications may be made without departing from the scope as defined by the appended claims.

The invention claimed is:

1. An apparatus comprising:
at least one processor, and
at least one memory storing instructions that, when executed by the at least one processor, cause the apparatus at least to:
receive a first transmission from an antenna, via a first frontend circuitry, the first transmission comprising a first carrier including a first signal and a second carrier including a second signal, wherein the first and second carriers are separated in frequency within a first operational band;
split the first transmission into a first channel and a second channel;
downconvert the first channel to centre the first carrier at a baseband frequency to extract the first signal;
downconvert the second channel to centre the second carrier at the baseband frequency to extract the second signal; and
provide the first signal to a first processor and the second signal to a second processor,
wherein the first and second processors are associated with first and second subscriber identity modules respectively, and
wherein the first front end circuitry is configured to operate at a third generation partnership project (3GPP) lowband frequency range, and comprises a plurality of paths each configured to operate within one or more bandgroup(s).

2. The apparatus according to claim 1, further configured to receive a second transmission from the antenna, the second transmission comprising a third carrier including a third signal, wherein a third carrier frequency of the third carrier is in a second operational band.

3. The apparatus according to claim 2, further configured to direct the second transmission to a third channel and downconvert the third channel to centre the third carrier at the baseband frequency to extract the third signal.

4. The apparatus according to claim 3, further configured to provide the third signal to the first or second processor.

5. The apparatus according to claim 1, further configured to control the gain of each signal independently from one another.

6. The apparatus according to claim 1, further configured to control the scheduling of each signal in time or frequency independently from one another.

7. The apparatus according to claim 1, wherein the first front end circuitry comprises three paths.

8. The apparatus according to claim 1, wherein at least one of the paths is configured to support carriers having an irregular channel bandwidth.

9. The apparatus according to claim 1, further comprising a second front end circuitry configured to operate within at least one of a 3GPP midband, highband or ultra-highband frequency range.

10. The apparatus as claimed in claim 1, wherein the first and second subscriber identity modules are available for use at the same time.

11. The apparatus as claimed in claim 1, further configured to provide receive diversity.

12. A method comprising:
receiving a first transmission from an antenna, via a first front end circuitry, the first transmission comprising a first carrier including a first signal and a second carrier including a second signal, wherein the first and second carriers are separated in frequency within a first operational band;
splitting the first transmission into a first channel and a second channel;
downconverting the first channel to centre the first carrier at a baseband frequency to extract the first signal;
downconverting the second channel to centre the second carrier at the baseband frequency to extract the second signal; and
providing the first signal to a first processor and the second signal to a second processor,
wherein the first and second processors are associated with first and second subscriber identity modules respectively, and
wherein the first front end circuitry is configured to operate at a third generation partnership project (3GPP) lowband frequency range, and comprises a plurality of paths each configured to operate within one or more bandgroup(s).

13. The method according to claim 12, further comprising receiving a second transmission from the antenna, the second transmission comprising a third carrier including a third signal, wherein a third carrier frequency of the third carrier is in a second operational band.

14. The method according to claim 13, further comprising:
directing the second transmission to a third channel; and
downconverting the third channel to centre the third carrier at the baseband frequency to extract the third signal.

15. The apparatus according to claim 14, further comprising providing the third signal to the first or second processor.

16. The method according to claim 12, further comprising controlling the gain of each signal independently from one another.

17. The method according to claim 12, further comprising controlling the scheduling of each signal in time or frequency independently from one another.

18. The method according to claim 12, wherein the first front end circuitry comprises three paths.

19. The method according to claim 12, wherein at least one of the paths is configured to support carriers having an irregular channel bandwidth.

20. A non-transitory computer readable medium comprising instructions which, when executed by an apparatus, cause the apparatus to:
receive a first transmission from an antenna, via a front end circuitry, the first transmission comprising a first carrier including a first signal and a second carrier including a second signal, wherein the first and second carriers are separated in frequency within a first operational band;

split the first transmission into a first channel and a second channel;
downconvert the first channel to centre the first carrier at a baseband frequency to extract the first signal;
downconvert the second channel to centre the second carrier at the baseband frequency to extract the second signal; and
provide the first signal to a first processor and the second signal to a second processor,
wherein the first and second processors are associated with first and second subscriber identity modules respectively, and
wherein the front end circuitry is configured to operate at a third generation partnership project (3GPP) lowband frequency range, and comprises a plurality of paths each configured to operate within one or more band-group(s).

* * * * *